(12) United States Patent
Miyazaki et al.

(10) Patent No.: US 8,943,123 B2
(45) Date of Patent: Jan. 27, 2015

(54) SERVER APPARATUS, NETWORK ACCESS METHOD, AND COMPUTER PROGRAM

(75) Inventors: Hideaki Miyazaki, Kobe (JP); Hiroyuki Nakahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 426 days.

(21) Appl. No.: 13/045,813

(22) Filed: Mar. 11, 2011

(65) Prior Publication Data

US 2011/0231480 A1    Sep. 22, 2011

(30) Foreign Application Priority Data

Mar. 19, 2010   (JP) ................................ 2010-064902

(51) Int. Cl.
| | | |
|---|---|---|
| *G06F 15/16* | (2006.01) | |
| *H04L 12/701* | (2013.01) | |
| *H04L 12/725* | (2013.01) | |

(52) U.S. Cl.
CPC .............. *H04L 45/00* (2013.01); *H04L 45/306* (2013.01)
USPC ........... 709/203; 709/220; 709/223; 709/228; 709/229

(58) Field of Classification Search
USPC ........... 709/203, 220, 223, 228, 229; 370/392
See application file for complete search history.

(56) References Cited

U.S. PATENT DOCUMENTS

| 6,182,146 | B1 * | 1/2001 | Graham-Cumming, Jr. . | 709/238 |
|---|---|---|---|---|
| 7,984,192 | B2 * | 7/2011 | Burr et al. ..................... | 709/250 |
| 2003/0028681 | A1 * | 2/2003 | Jain et al. ..................... | 709/313 |
| 2004/0139236 | A1 * | 7/2004 | Mehra et al. .................. | 709/250 |
| 2007/0115987 | A1 * | 5/2007 | Hoekstra ....................... | 370/392 |
| 2009/0190590 | A1 * | 7/2009 | Agetsuma et al. ............ | 370/392 |

FOREIGN PATENT DOCUMENTS

| JP | 2003-167805 A | 6/2003 |
|---|---|---|
| JP | 2005-100194 A | 4/2005 |
| JP | 2006-352567 A | 12/2006 |

OTHER PUBLICATIONS

Japanese Office Action mailed Sep. 3, 2013 for corresponding Japanese Application No. 2010-064902, with Partial English-language Translation.

* cited by examiner

*Primary Examiner* — Liangche A Wang
*Assistant Examiner* — Cheikh Ndiaye
(74) *Attorney, Agent, or Firm* — Oblon, Spivak, McClelland, Maier & Neustadt, L.L.P.

(57) ABSTRACT

A server apparatus having a plurality of interfaces to each of which a network is connected, the server apparatus includes an application identification device for identifying an application program which is a source of a packet, on the basis of information in the packet, when the packet is sent to a network connected to any one of the plurality of interfaces, an interface designation device for designating one interface which is previously caused to correspond to an identified application program, among the plurality of interfaces, as a sending interface which is used in routing of the packet, and an routing device for sending the packet to a network connected to a designated interface.

9 Claims, 9 Drawing Sheets

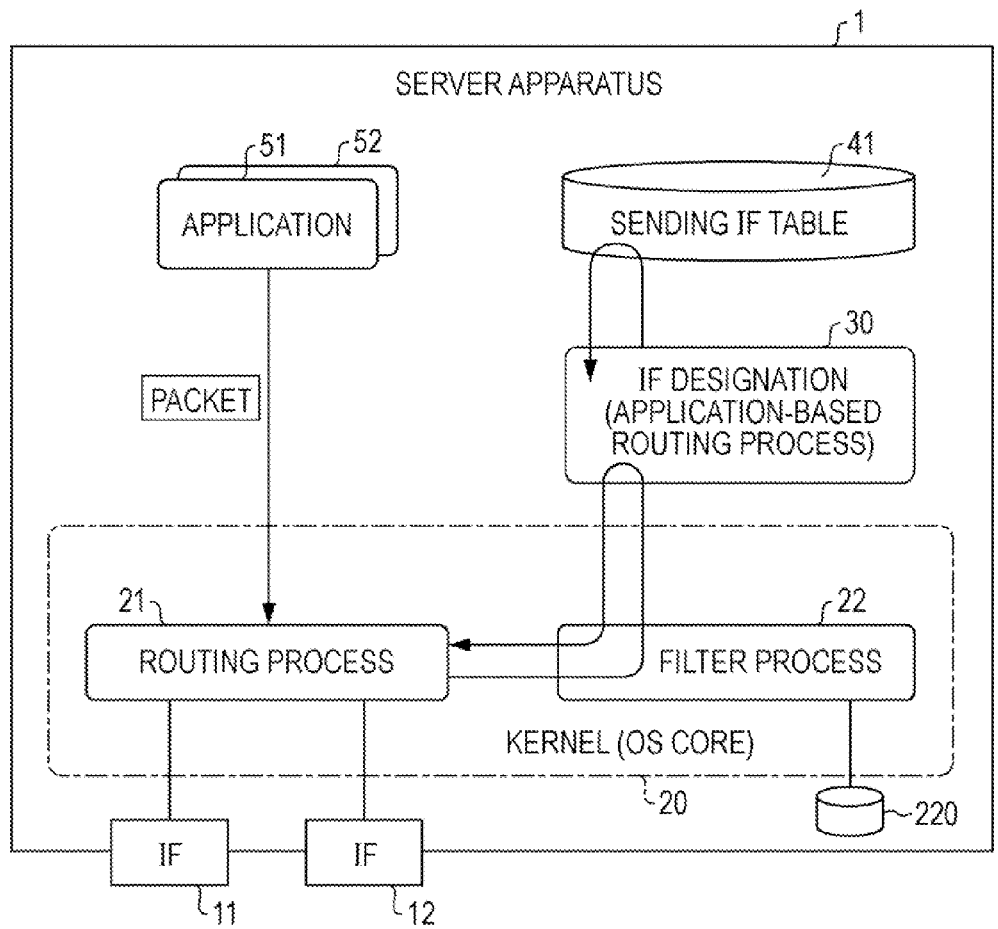

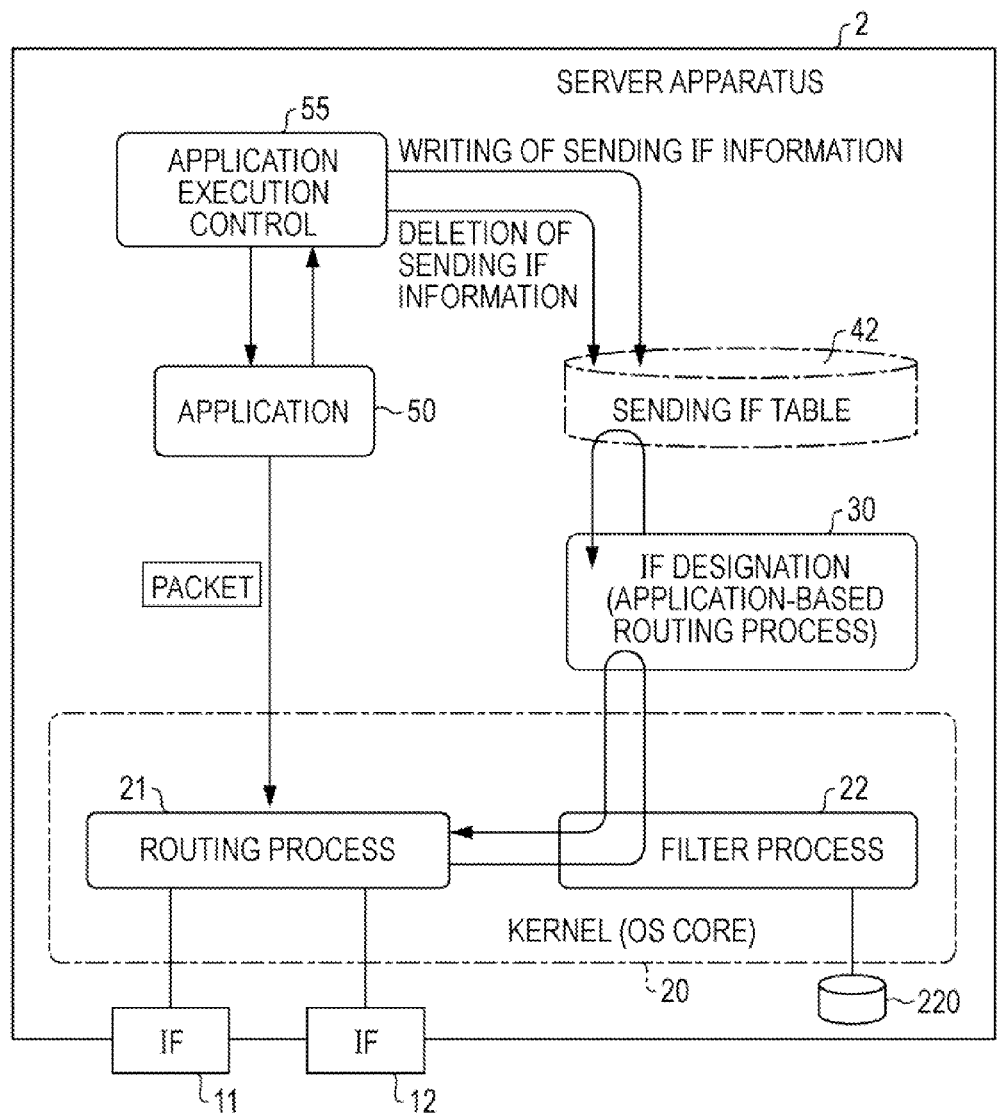

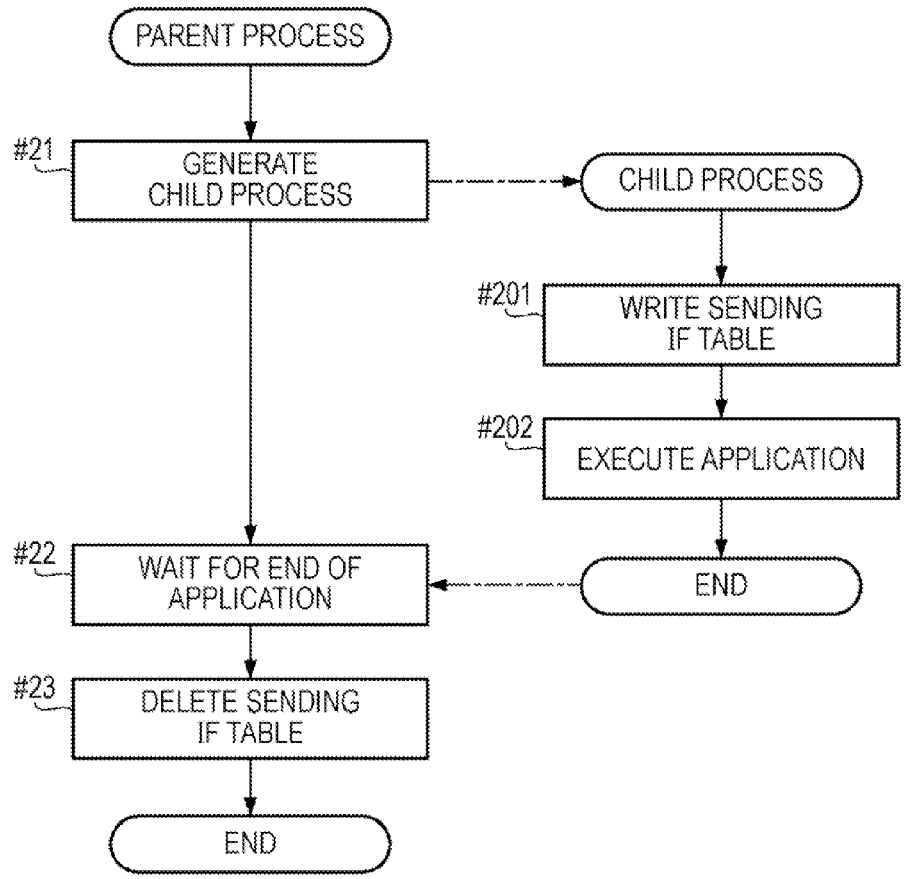

| PROTCOL | INTERNAL PORT NUMBER | EXTERNAL PORT NUMBER | SENDING IF |
|---------|---------------------|---------------------|------------|
| TCP | 8001 | 80 | IF-1 |
| TCP | 8002 | 80 | IF-2 |
| ⋮ | ⋮ | ⋮ | ⋮ |

SERVER APPARATUS, NETWORK ACCESS METHOD, AND COMPUTER PROGRAM

CROSS-REFERENCE TO RELATED APPLICATION

This application is based upon and claims the benefit of priority of the prior Japanese Patent Application No. 2010-64902, filed on Mar. 19, 2010, the entire contents of which are incorporated herein by reference.

FIELD

The application relates to a server apparatus to which a plurality of networks are connected, and a computer program which is executed in the server apparatus.

BACKGROUND

Various network services such as hosting of servers and supervision of VPNs (Virtual Private Networks) of customers have been provided by providers such as ISPs (Internet Service Providers). In order to provide such services, a server system having a capacity corresponding to the number of customers is used, and constructed VPNs of customers of each provider are accommodated in a server system operated by the provider. Usually, the server system includes a plurality of server apparatuses each executing a predetermined program.

As an effective method for reducing the operation and management cost of the server system, "multi-tenant" has been known. In multi-tenant, unlike single-tenant, a plurality of networks are accommodated in one server apparatus. When a single-tenant server system is modified to a multi-tenant server system, the number of server apparatuses can be reduced.

However, a general server apparatus cannot accommodate a plurality of VPNs having the same private address. The reason is as follows. A general server apparatus has only one protocol stack concerning a routing process. When a packet is sent, the protocol stack searches a routing table and determines a network which is a destination of the packet. In the routing table, a communication interface provided for each customer is caused to correspond to an address of a network connected to each interface. However, when some addresses registered in the routing table are the same, a network whose registration order is high is always selected by searching with the address as a key. Thus, as for a plurality of networks having the same address registered in the routing table, packets are sent to only one network which is always selected therefrom.

In existing art regarding multi-tenant, a plurality of protocol stacks and a plurality of virtual execution environments for application software are prepared in a server apparatus, and a dedicated protocol stack and a dedicated execution environment are allocated to each customer's network (Japanese Laid-open Patent Publication No. 2005-100194, Japanese Laid-open Patent Publication No. 2003-167805). According to this existing art, one server apparatus is physically and virtually separated for each customer's network. Thus, a server apparatus to which this existing art is applied can accommodate a plurality of networks having the same private address.

In the case where an operation system implemented in a server apparatus has only one protocol stack, the operation system needs to be drastically modified or replaced, in order to implement multi-tenant by using the above existing art. This is because a plurality of protocol stacks have to be implemented. In addition, it is needed to incorporate a function of selecting one protocol stack from among a plurality of protocol stacks, into each of various pieces of application software (hereinafter, abbreviated as application) each using a protocol stack.

SUMMARY

According to an aspect of the invention, A server apparatus includes a plurality of interfaces, an application identification device, an interface designation device, and a routing device. A network is connected to each of the plurality of interfaces. When a packet is sent to a network connected to any one of the plurality of interfaces, the application identification device identifies an application program which is a source of the packet, on the basis of information in the packet. The interface designation device designates one interface which is previously caused to correspond to the identified application program, among the plurality of interfaces, as a sending interface which is used in routing of the packet. The routing device sends the packet to a network connected to the designated interface.

BRIEF DESCRIPTION OF DRAWINGS

FIG. 3 is a diagram illustrating a module configuration of a relevant portion of a server apparatus according to the first embodiment.

FIG. 4 is a diagram illustrating an example of a sending IF table according to the first embodiment.

FIG. 7 is a diagram illustrating a module configuration of a relevant portion of a server apparatus according to the second embodiment.

FIG. 8 is a diagram illustrating an example of a sending IF table according to the second embodiment.

FIG. 9 is a flowchart showing functions of an application execution control module according to the second embodiment.

DESCRIPTION OF EMBODIMENTS

Figure 1:
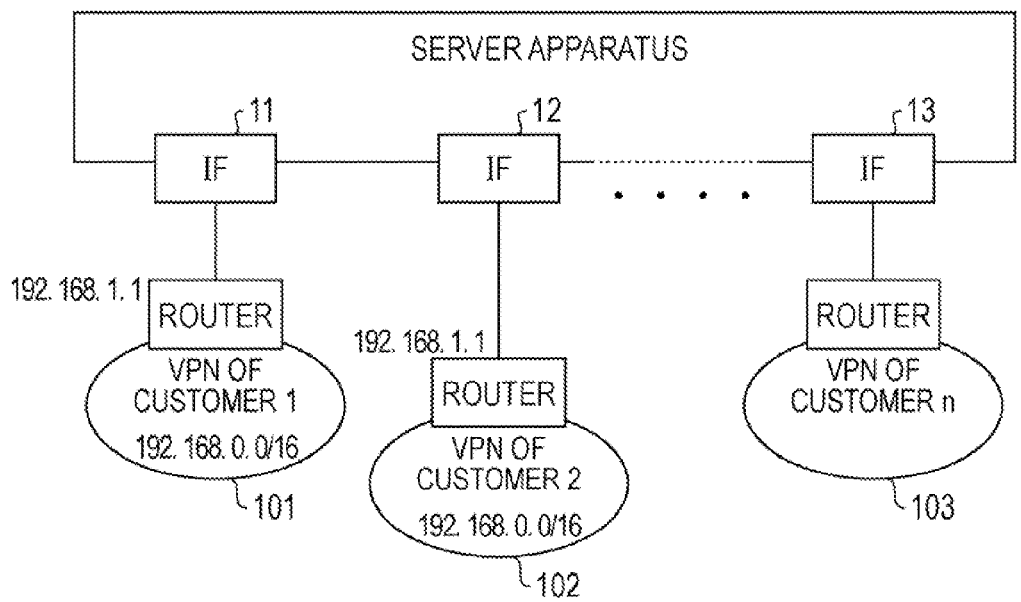
FIG. 1 is a diagram illustrating a mode of accommodation of networks in a server apparatus.

A server apparatus including a plurality of interfaces (hereinafter, may be referred to as Ifs) 11, 12, and 13 as shown in FIG. 1, is assumed. The server apparatus is operated, for example, by a provider which provides a network service to a plurality of customers. VPNs 101, 102, and 103 of different customers 1, 2, … n are connected to the interfaces 11, 12, and 13, respectively, and accommodated by the server apparatus. The interfaces 101, 102, and 103 may be physical interfaces such as network interface cards, or may be logical interfaces such as VLANs (Virtual Local Area Networks).

Each of the VPNs 101, 102, and 103 has an address architecture set by the customer. A general address is often set as a private address, and thus the same address is often used for the VPNs 101, 102, and 103. In the illustrated example, the VPN 101 of the customer 1 and the VPN 102 of the customer 2 have the same network address which is 192.168.0.0/16 according to IPv4 (Internet Protocol version 4). However, 192.168.0.0/16 is merely an example. Note that "/16" in the address indicates that the upper 16 bits in a 32-bit IP address correspond to an IP network address portion and the remaining bits correspond to an IP host address portion.

Hereinafter, first to third embodiments relating to a server apparatus which can accommodate the VPNs 101 and 102 having the same address as described above, are disclosed. In the first to third embodiments, the two VPNs 101 and 102 are shown, and the VPN 103 is omitted. TCP (Transmission Control Protocol) is described as a protocol, but other protocols such as UDP (User Datagram Protocol) may be used in the first to third embodiments.

First Embodiment

Figure 2:
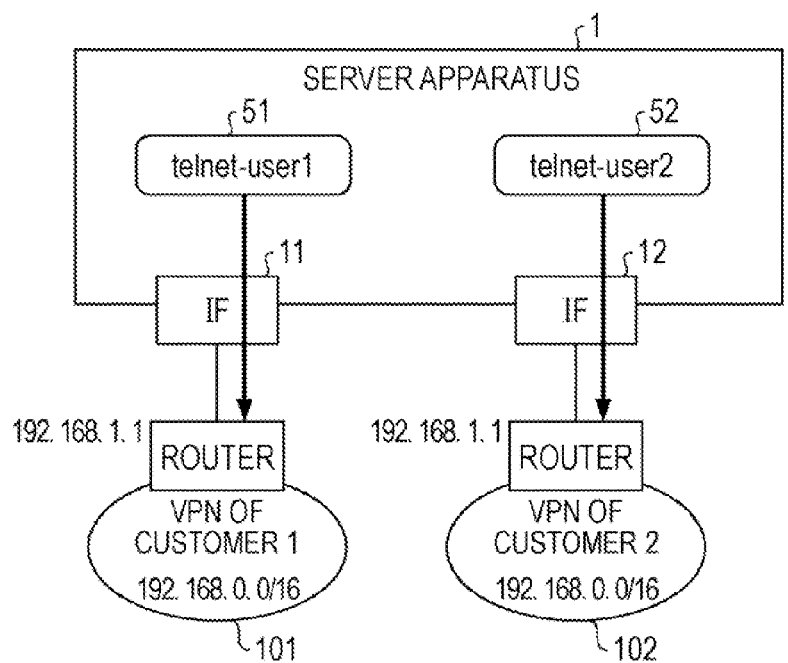
FIG. 2 is a diagram illustrating an outline of data communication of a first embodiment.

As shown in FIG. 2, a server apparatus 1 according to the first embodiment executes applications 51 and 52 which are prepared for each customer. The applications 51 and 52 are not passive applications which wait for access from the VPNs 101 and 102 and respond, but actively access the VPNs 101 and 102. A specific example of the applications 51 and 52 is "telnet" which remotely controls a computer in a network. The application 51 sends a packet to the VPN 101 of the customer 1, and the application 52 sends a packet to the VPN 102 of the customer 2. Strictly speaking, each of the applications 51 and 52 requests an operation system (hereinafter, referred to as OS), which is not shown, to send a packet. At this time, since the VPN 101 and the VPN 102 have the same address, the destination of a packet sent by each of the applications 51 and 52 is the VPN 101 and the VPN 102. Thus, in the server apparatus 1, later-described software which designates interfaces 11 and 12 for the OS is implemented. By cooperation of this software and the OS, the applications 51 and 52 can access the VPNs 101 and 102 of the customers 1 and 2 as shown by arrows in the drawing.

Note that, when packets from VPNs 101 and 102 in response to accesses from the applications 51 and 52 are received, it is not needed to designate the interfaces 11 and 12 in the server apparatus 1. The packets from the VPNs 101 and 102 are delivered to the OS of the server apparatus 1 via the interfaces 11 and 12 connected to the VPNs 101 and 102, respectively. The OS delivers the packets from the VPNs 101 and 102 to the applications 51 and 52 by which these packets can be received, on the basis of identifiers (e.g., port numbers) which are included as destination information in the packets from the VPNs 101 and 102 and uniquely indicate the applications 51 and 52, respectively.

A module configuration of a relevant portion of the server apparatus 1 is shown in FIG. 3. The server apparatus 1 includes an OS including a kernel 20, and also includes: an IF designation module 30 which is implemented for implementing multi-tenant; and a sending IF table 41. The kernel 20, which is a core portion of the OS, includes a routing process module 21 and a filter process module 22. The routing process module 21 is responsible for routing in sending and receiving a packet. The filter process module 22 extracts a packet which meets a previously-set condition, for example, as in "iptables" which is software implemented in Linux known as one of OSs.

The IF designation module 30 is software which cooperates with the kernel 20, and is responsible for an application-based routing process of designating one of a plurality of the interfaces 11 and 12 as a sending interface. The sending IF table 41 is a data file which is referred to by the IF designation module 30, and is previously created and stored in a nonvolatile memory. The contents of the sending IF table 41 are shown in FIG. 4.

As shown in FIG. 4, in the sending IF table 41, an application identifier corresponds to an interface (referred to as sending interface) used when a packet is sent, out of a plurality of the interfaces 11 and 12. In the illustrated sending IF table 41, a command name is used as an application identifier. The applications 51 and 52 are "telnets" as described above, and are distinguished from each other by changing the command name to telnet-user1 or telnet-user2 for each customer. An identifier "IF-1" indicating the interface 11 is caused to correspond to a command name "telnet-user1" uniquely indicating the application 51, and an identifier "IF-2" indicating the interface 12 is caused to correspond to a command name "telnet-user2" uniquely indicating the application 52. Note that the application identifier is not limited to the command name, and may be any identifier which uniquely identifies each of various applications including the applications 51 and 52. For example, a user ID (identification) unique to a customer or a group ID, which is assigned to each application, can be the application identifier.

In operation of the server apparatus 1, before the applications 51 and 52 are activated automatically or in response to a manual operation, contents of a filter process performed by the filter process module 22 of the kernel 20 are set, and the sending IF table 41 is created. For the filter process, a filter is set such that packets sent from the applications 51 and 52 flow to the IF designation module 30. For example, in the case of "telnet", a packet of which a destination port number from each of the applications 51 and 52 to TCP is a well-known port number "23", is a filtering target. Specifically, a command set by "iptables" is "iptables ?t mangle ?A OUTPUT ?p tcp ?dport 23 ?j QUEUE". The set contents of the filter process are recorded in a table 220. In the sending IF table 41, the sending interfaces corresponding to the applications 51 and 52 are stored as described above.

Figure 5:
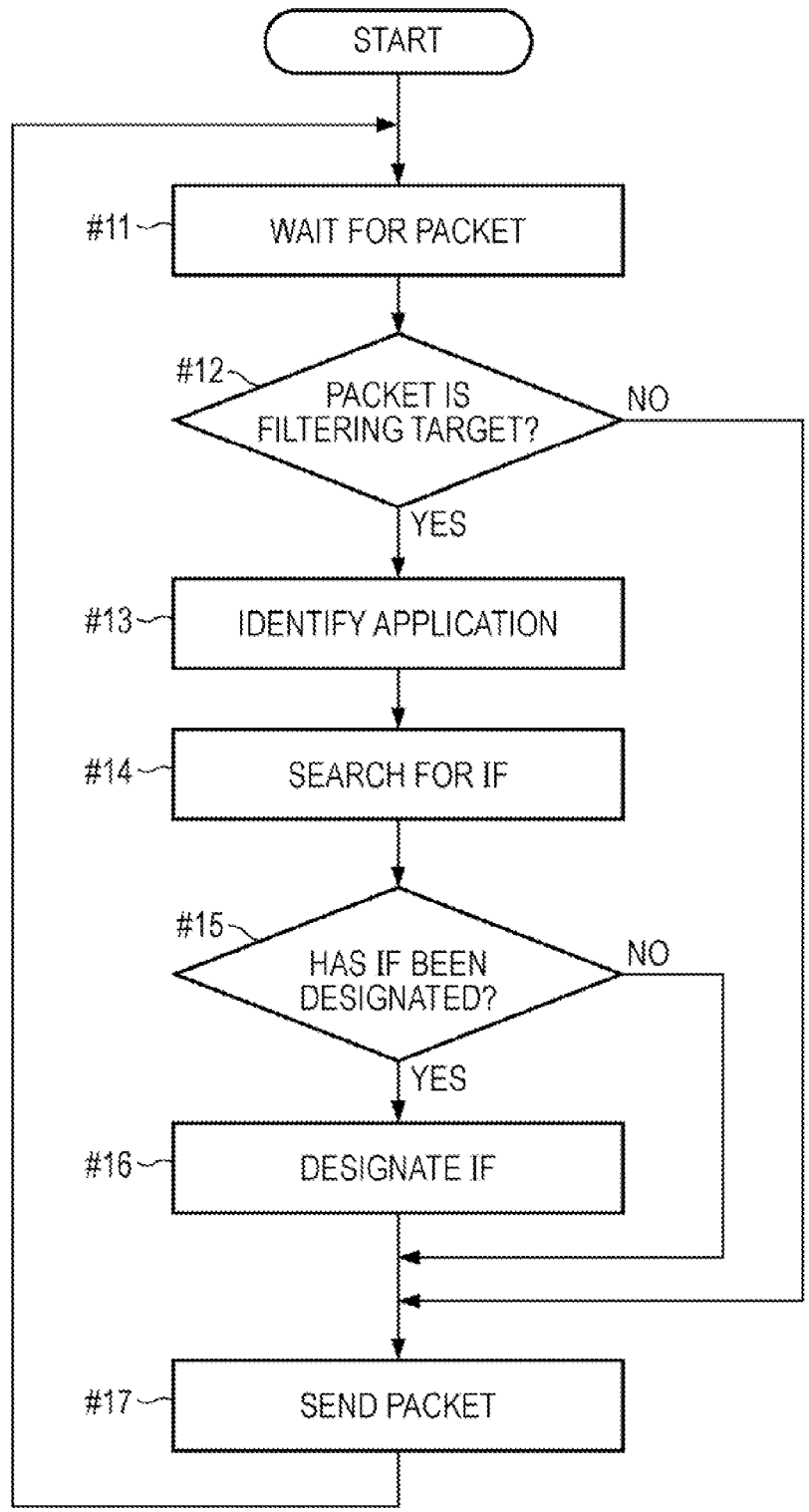
FIG. 5 is a flowchart showing actions of a packet process in the server apparatus according to the first embodiment.

A flowchart of FIG. 5 shows actions of the packet process in the server apparatus 1 according to the first embodiment.

The kernel 20 of the OS waits for arrival of a packet from the inside or the outside of the server apparatus 1 (#11). When a packet arrives, the filter process module 22 performs filtering. When the packet is a set target packet, the filter process module 22 notifies the IF designation module 30 of the packet (YES at #12). In the first embodiment, the packets sent from the applications 51 and 52 are target packets. When the packet is not a target packet, the IF designation module 30 does not deal with the packet, and the routing process module 21 performs normal routing for delivering the packet to its destination (#12, #17).

The IF designation module 30 notified by the filter process module 22 obtains a command name as an application identifier on the basis of a TCP source port number (application side port number) in the packet (#13). For example, by using "netstat ? tan p" which is a command, a list of port numbers and command names of TCP which is managed by the OS can be obtained. As an application identifier, another identifier such as a process ID as is described in the second embodiment is also considered to be obtained as appropriate.

The IF designation module 30 which has obtained the command name searches the sending IF table 41 to check a sending interface corresponding to the command name (#14, #15). When the sending interface is found (YES at #15), the IF designation module 30 sets the packet such that the packet flows to the found sending interface, and transfers the packet to the routing process module 21 (#16). When the sending interface is not found (NO at #15), the IF designation module 30 transfers the packet to the routing process module 21 without change.

The routing process module 21 which has received the packet from the IF designation module 30 performs normal routing on the basis of destination information in the packet (#17). By this routing, a packet for which the interface 11 is designated as a sending interface is sent to the VPN 101 of the customer 1. In addition, a packet for which the interface 12 is designated as a sending interface is sent to the VPN 102 of the customer 2.

Second Embodiment

Figure 6:
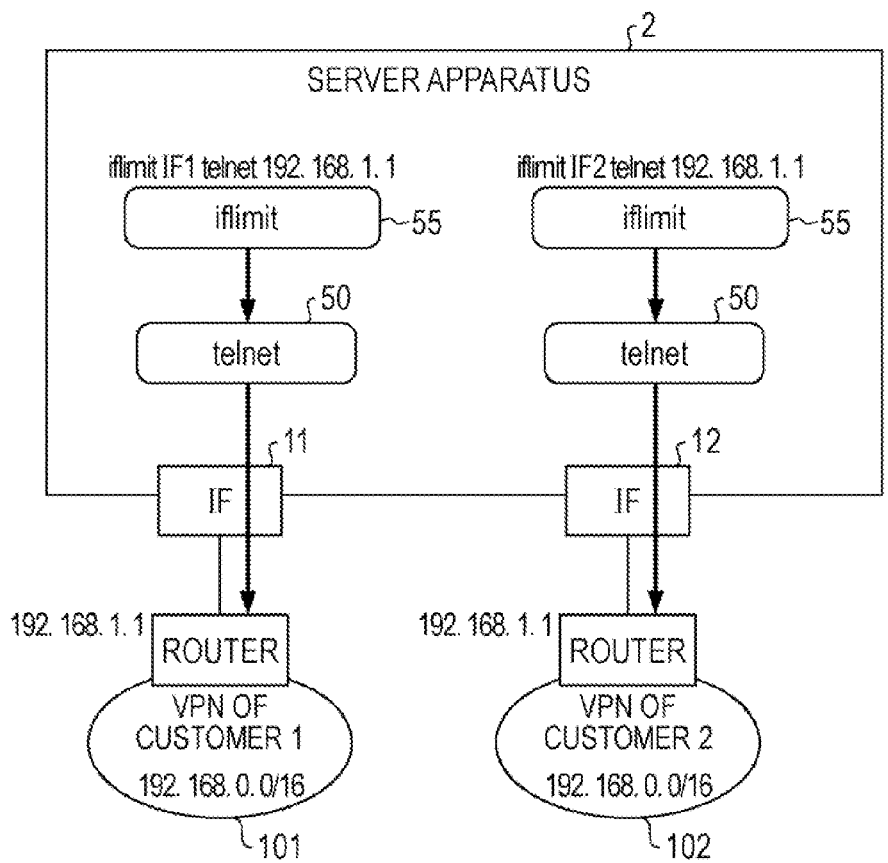
FIG. 6 is a diagram illustrating an outline of data communication of a second embodiment.

As shown in FIG. 6, in a server apparatus 2 according to the second embodiment, an application execution control module 55 executes an application 50. On this occasion, the application execution control module 55 designates a sending interface. Here, as an example, a command name of the application execution control module 55 is "iflimit"; a command of the application 50 is "telnet 192.168.1.1"; and identifiers of the interfaces 11 and 12 are "IF1" and "IF2". In this case, by a command such as "iflimit IF1 telnet 192.168.1.1" or "iflimit IF2 telnet 192.168.1.1", a sending interface can be designated. When the application execution control module 55 designates the interface 11, the application 50 accesses the VPN 101 of the customer 1. When the application execution control module 55 designates the interface 12, the application 50 accesses the VPN 102 of the customer 2.

A module configuration of a relevant portion of the server apparatus 2 is shown in FIG. 7. The server apparatus 2 includes an OS including a kernel 20, and also includes: an IF designation module 30 which is implemented for implementing multi-tenant; and the aforementioned application execution control module 55. The kernel 20 and the IF designation module 30 have the same functions as those of the first embodiment in FIG. 3.

In the server apparatus 2, a sending IF table 42 which indicates correspondence of the application 50 and a sending interface is created at execution of the application 50, and deleted at end of the execution. In other words, unlike the first embodiment in which a table is previously created, a table is dynamic. The sending IF table 42 included in the server apparatus 2 during execution of the application 50 is searched by the IF designation module 30.

An application identifier in the sending IF table 42 illustrated in FIG. 8 is a process ID which is used by the kernel 20 for process management. In the illustration, an interface corresponding to a process ID "10000" is an identifier "IF-1" indicating the interface 11, and an interface corresponding to a process ID "10002" is an identifier "IF-2" indicating the interface 12. Note that process IDs are assigned in order of generation of processes, and thus process IDs which are caused to correspond to the interfaces 11 and 12 are different depending of a generation time.

A flowchart of FIG. 9 shows functions of the application execution control module 55. At a time when the application execution control module 55 is activated, contents of a filter process performed by a filter process module 22 of the kernel 20 are set similarly to the first embodiment. In other words, in a state when preparations have been made for the kernel 20 and the IF designation module 30 to cooperate to send packets correctly to the VPNs 101 and 102, the application execution control module 55 is activated.

In order to concurrently perform two processes which are application monitoring and application execution, the application execution control module 55 generates a child process for application execution (#21). The child process obtains an own process ID from the OS, and writes the own process ID as a sending IF table 42 into a predetermined memory area such that the own process ID corresponds to an identifier of a sending interface which is designated by a command input at performance of a parent process (#201). When a sending IF table 42 has already been created by another child process at this time, the child process records the correspondence of the process ID and the sending interface by adding it to the already existing sending IF table 42. The action of this step #201 corresponds to a function of a correspondence setting device. Then, the child process executes a designated command which is the application 50 (#202). For example, when the command is "telnet 192.168.1.1", the child process sends a packet of which a destination IP address is "192.168.1.1".

After the packet is sent from the child process, the kernel 20 and the IF designation module 30 cooperate to perform actions similarly to the actions in FIG. 5. The filter process module 22 notifies the IF designation module 30 of the packet, and the IF designation module 30 sets the packet such that the packet flows to the sending interface indicated by the sending IF table 42. Then, the routing process module 21 performs routing of the packet.

After the generation of the child process, the parent process waits for end of the child process (#22). When detecting the end of the child process from a process management action of the OS, the parent process deletes the data written by the child process into the sending IF table 42 (#23). At this time, when there is no data written by any other child process, the sending IF table 42 substantially disappears. The action of this step #23 corresponds to a function of a correspondence cancellation device.

In the above second embodiment, instead of the process ID of the child process which executes the application 50, a process ID of the parent process which monitors execution of the application 50 can be used as an application identifier. The process ID of the parent process is written into the sending IF table 42, and the process ID is not obtained on the basis of a port number at application identification for extracting a target packet, but the parent process ID is further obtained from process IDs. By so doing, even when the application 50 further generates a child process or calls an external command by a shell script, a desired search result can be obtained from the sending IF table 42.

Third Embodiment

Figure 10:
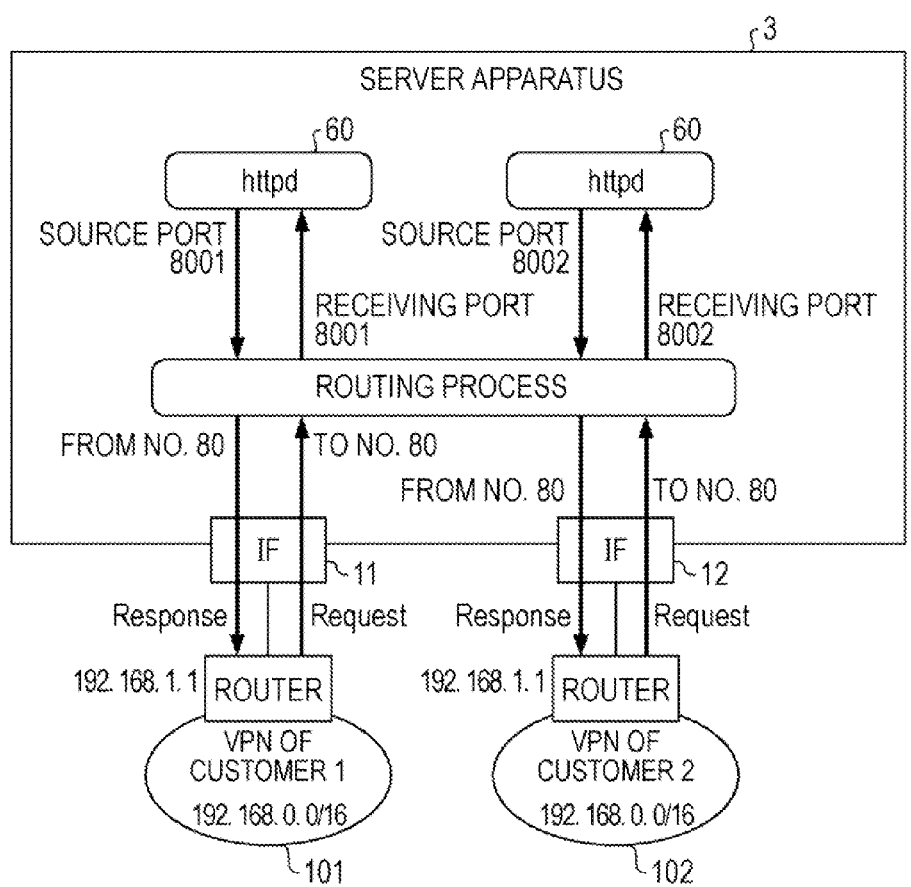
FIG. 10 is a diagram illustrating an outline of data communication of a third embodiment.

As shown in FIG. 10, in a server apparatus 3 according to the third embodiment, a passive application 60 is implemented which starts to be executed in response to a request from each of the VPNs 101 and 102 of the customers 1 and 2. A specific example of the application 60 is "httpd" which is a daemon providing functions of an HTTP (Hypertext Transfer Protocol) server. The server apparatus 3 activates the application 60 for each of the VPN 101 of the customer 1 and the VPN 102 of the customer 2. At activation, different port numbers are assigned to customers, respectively, in order to prevent interference between the customers. For example, the port number for the customer 1 is "8001", and the port number for the customer 2 is "8002". However, an access request from the customers 1 and 2 side designates a well-known port number ("80" in httpd), not such a port number for each customer. Therefore, the server apparatus 3 changes a packet which is received via each of the interfaces 11 and 12 and of which a destination is the well-known port number, such that the destination is a customer port number corresponding to each of the interfaces 11 and 12, and transfers the packet to the application 60. In addition, the server apparatus 3 changes a packet of which source information is a customer port number created by the application 60, such that the source information is the well-known port number, and sends the packet to the interface 11 or 12 corresponding to the VPN 101 or 102 which has made the request.

Figures 11, 12:
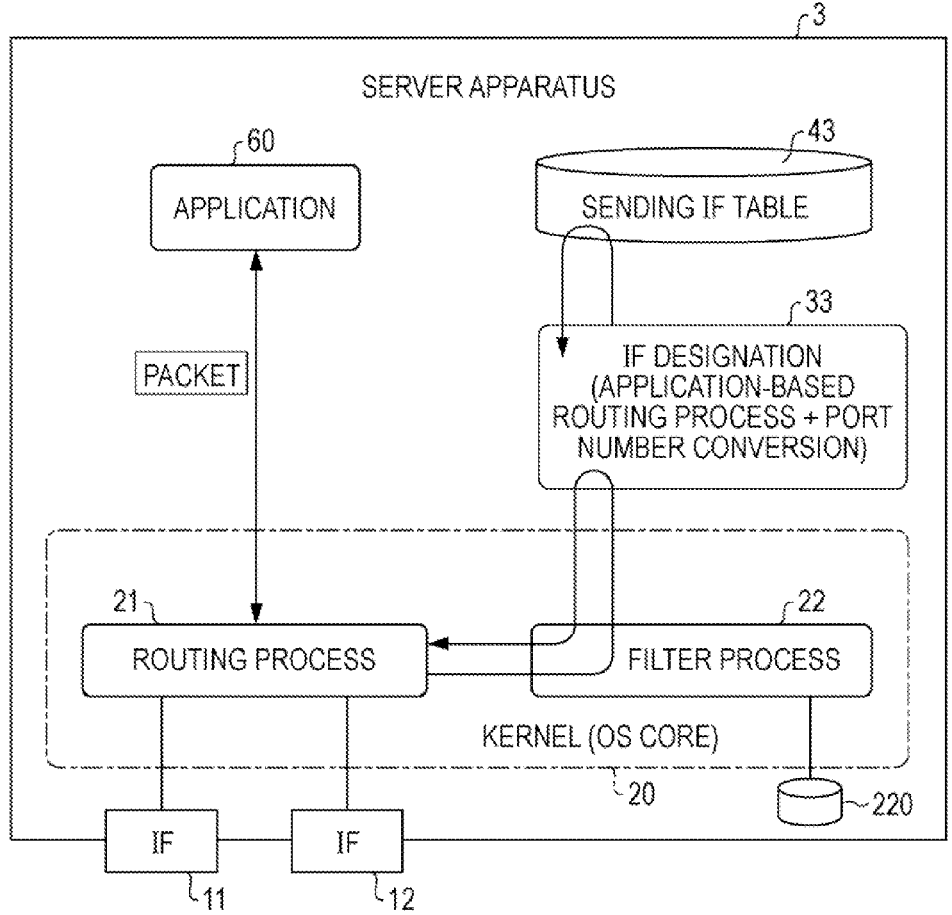
FIG. 11 is diagram illustrating a module configuration of a relevant portion of a server apparatus according to the third embodiment.
FIG. 12 is a diagram illustrating an example of a sending IF table according to the third embodiment.

A module configuration of a relevant portion of the server apparatus 3 is shown in FIG. 11. The server apparatus 3 includes an OS including a kernel 20, and also includes: an IF designation module 33 which is implemented for implementing multi-tenant; and a sending IF table 43. A configuration and a function of the kernel 20 are the same as those of first embodiment in FIG. 3.

The IF designation module 33 is responsible for: an application-based routing process of designating one of a plurality of the interfaces 11 and 12 as a sending interface; and port number conversion of a send/receive packet. The sending IF table 43 is a data file which is referred to by the IF designation module 33, and is previously created and stored in a nonvolatile memory. The contents of the sending IF table 43 are shown in FIG. 12.

As shown in FIG. 12, in the sending IF table 43, a pair of an internal port number and an external port number corresponds to a sending interface. The internal port number is the aforementioned customer port number assigned to the application 60. The external port number is a port number which is an identifier of the application 60 for the VPNs 101 and 102 of the customers 1 and 2. The illustrated external port number is a well-known port number "80" assigned to "HTTP".

In operation of the server apparatus 3, before the application 60 is accessed from the VPNs 101 and 102, contents of the filter process performed by a filter process module 22 of the kernel 20 are set and the sending IF table 43 is created. For the filter process, a filter is set such that packets received from the VPNs 101 and 102 and packets sent by the application 60 flow to the IF designation module 30. For example, in the case of "httpd", a receive packet of which a destination port number of TCP is a well-known port number "80" is a filtering target. In addition, a send packet of which a source port number is "8001" or "8002" which is an external port number of the sending IF table 43 is a filtering target. Specifically, a command set by "iptables" is "iptables ?t mangle ?A OUTPUT ?p tcp ?sport 8001,8002 ?j QUEUE ?iptables ?t mangle ?A INPUT ?p tcp ?dport 80 ?j QUEUE". In the sending IF table 43, correspondence among a protocol, an internal port number, an external port number, and a sending interface is stored as shown in FIG. 12.

Figure 13:
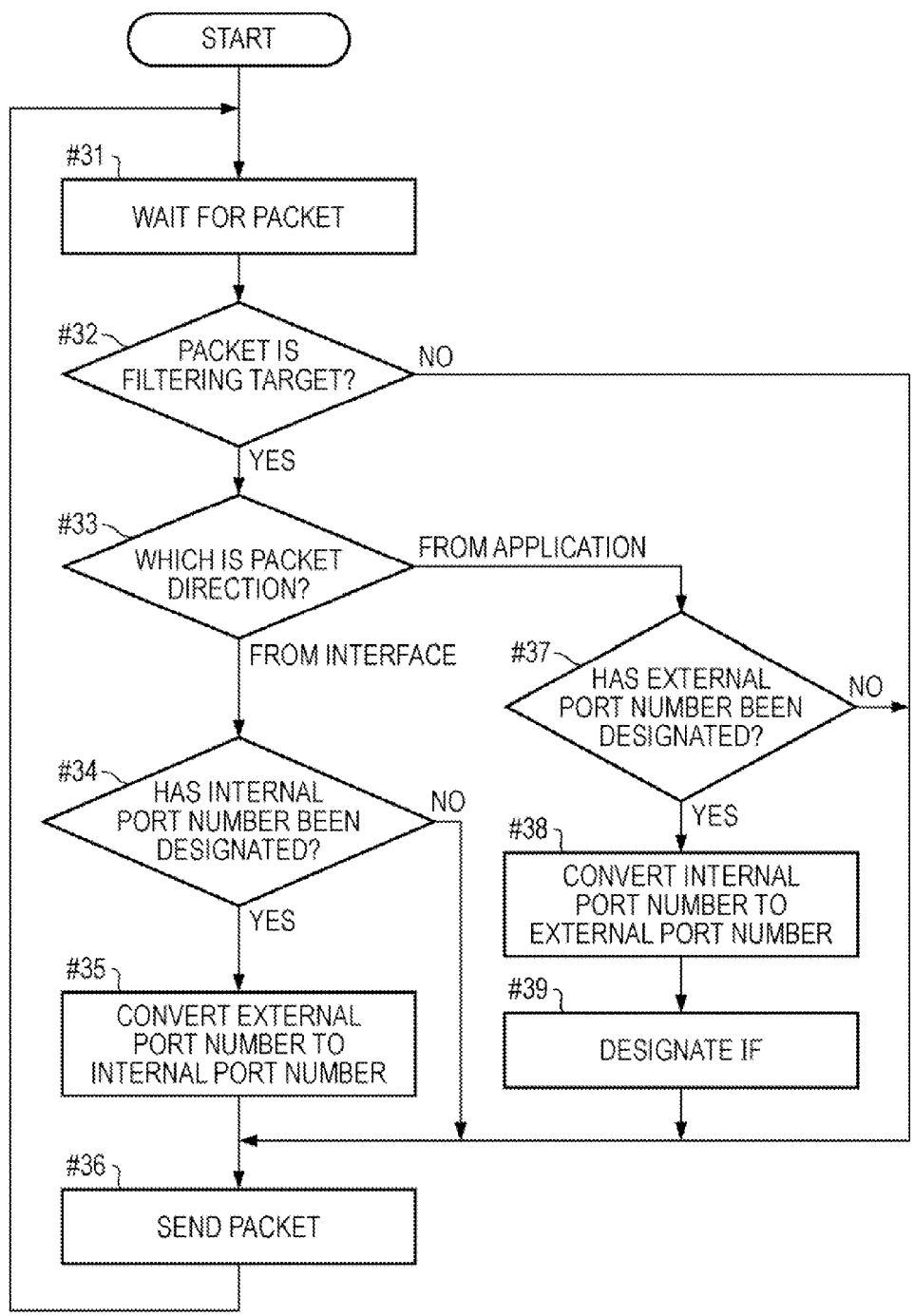
FIG. 13 is a flowchart showing actions of a packet process in the server apparatus according to the third embodiment.

A flowchart of FIG. 13 shows actions of a packet process in the server apparatus 3 according to the third embodiment.

The kernel 20 of the OS waits for arrival of a packet from the inside or the outside of the server apparatus 3 (#31). When a packet arrives, the filter process module 22 performs filtering. When the packet is a set target packet (YES at #32), the filter process module 22 notifies the IF designation module 33 of the packet. When the arriving packet is not a target packet (NO at #32), the IF designation module 33 does not deal with the packet, and the routing process module 21 performs normal routing for delivering the packet to its destination (#36).

The IF designation module 33 notified by the filter process module 22 determines whether the target packet has been received via the interface 11 or 12 or has been sent by the application 60 (#33). A subsequent process is different depending on the determination result.

When the target packet is a packet received via the interface 11 or 12, the IF designation module 33 obtains a value of a protocol/destination port number described in the packet, and then searches the sending IF table 43. In the search, together with the obtained value of the protocol/destination port number, an identifier of a receiving interface notified by the filter process module 22 is used as a search key. Then, a value of an internal port number is obtained which is caused to correspond to: a value of an external port number which agrees with the value of the protocol/destination port number; and an identifier of a sending interface which agrees with the identifier of the receiving interface. For example, in the example of FIG. 12, when the value of the destination port number is "80" as a search key and the identifier of the receiving interface is "IF-1", "8001" is obtained as the value of the internal port number. The IF designation module 33 which has obtained the value of the internal port number converts the value of the destination port number in the packet to the obtained value of the internal port number, and updates a checksum value of an IP/TCP header in the packet such that the checksum value matches a value after the conversion (#34, #35). Then, the IF designation module 33 transfers, to the routing process module 21 of the kernel 20, the packet of which the destination port number has been converted from the external port number to the internal port number in this manner.

On the other hand, when the target packet is a packet sent by the application 60, the IF designation module 33 obtains a value of a source port number described in the packet, and then searches the sending IF table 43. In the search, together with the obtained value of the source port number, a protocol is used as a search key. Then, a value of an external port number and an identifier of a sending interface are obtained which have the same corresponding protocol and are caused to correspond to a value of an internal port number which agrees with the value of the source port number. For example, in the example of FIG. 12, when the protocol is TCP and the value of the source port number is "8002", an external port number value "80" and a sending interface identifier "IF-2" are obtained. Next, the IF designation module 33 converts the value of the destination port number in the packet to the obtained value of the external port number, and updates a checksum value of an IP/TCP header in the packet such that the checksum value matches a value after the conversion (#37, #38). Subsequently, the IF designation module 33 sets the packet such that the packet flows to the interface 11 or the interface 12 which corresponds to the obtained identifier of the sending interface, and transfers the packet to the routing process module 21 (#39).

The routing process module 21 which has received the packet from the IF designation module 33 performs normal routing on the basis of the destination information in the packet (#36). Note that, when no data is found by the search of the sending IF table 43 (NO at #34 or NO at #37), a normal routing process is performed on the packet of which the value of the destination port number remains unchanged.

According to the first to third embodiments described above, multi-tenant can be implemented in an environment in which an operation system, which does not include a plurality of protocol stacks, operates. In other words, by using a general operation system for single-tenant, a multi-tenant-adaptive server apparatus can be provided.

According to the third embodiment, since bidirectional conversion between the external port number and the internal port number is performed, each of the customers 1 and 2 dose not need to perform an operation of designating an internal port number or to set an internal port number, in order to utilize the application 60. When port number conversion is not performed, a server apparatus, which is accessible by designation of a URL (Uniform Resource Locator) of, for example, "http://xx.com" before implementing multi-tenant, cannot be accessed as a result of such designation. The customer 1 has to designate a URL of "http://xx.com:8001", and the customer 2 has to designate a URL of "http://xx.com:8002". According to the third embodiment, the customers 1 and 2 can access the server apparatus 3 by URL designation which is the same as that before implementing multi-tenant.

What is claimed is:

1. A server apparatus having a plurality of interfaces to each of which different virtual private networks are connected, the server apparatus comprising:
   a memory; and
   a processor coupled to the memory and configured to:
      assign a specific interface which is connected to a specific virtual private network through which first application is activated, from the plurality of interfaces in response to activation of the first application;
      associate the assigned specific interface with a first identifier for identifying the first application to distinguish the first application from another application executed in the server apparatus;
      convert the first identifier included in a packet to a second identifier when the first application executed by the server apparatus sends the packet to the specific virtual private network, the second identifier identifying a type of the first application in the specific virtual private network;
      designate the assigned specific interface on the basis of the first identifier included in the packet that is sent by the first application; and
      send the packet to the assigned specific virtual private network connected to the designated interface.

2. The server apparatus according to claim 1, wherein processor is further configured to:
   when the server apparatus receives another packet including a second identifier through the specific interface, convert the second identifier of the another packet to the first identifier, and
   transfer the another packet to the first application corresponding to the first identifier.

3. The server apparatus of claim 1, wherein the first application is distinguished from the another application of a same type as the first application in the server apparatus by the first identifier.

4. A non-transitory computer readable storage medium having stored therein a computer program for a server apparatus comprising a plurality of interfaces to each of which different virtual private networks are connected, the computer program causing the server apparatus to execute a process comprising:
   assigning a specific interface which is connected to a specific virtual private network through which first application is activated, from the plurality of interfaces in response to activation of the first application;
   associating the assigned specific interface with a first identifier for identifying the first application to distinguish the first application from another application executed in the server apparatus;
   converting the first identifier included in a packet to a second identifier when the first application executed by the server apparatus sends the packet to the specific virtual private network, the second identifier identifying a type of the first application in the specific virtual private network;
   designating the assigned specific interface on the basis of the first identifier included in the packet that is sent by the first application; and
   sending the packet to the assigned specific virtual private network connected to the designated interface.

5. The non-transitory computer readable storage medium according to claim 4, wherein the process further comprises:
   when the server apparatus receives another packet including a second identifier through the specific interface, converting the second identifier of the another packet to the first identifier, and
   transferring the another packet to the first application corresponding to the first identifier.

6. The no-transitory computer readable medium of claim 4, wherein the first application is distinguished from the another application of a same type as the first application in the server apparatus by the first identifier.

7. A method for accessing from a server apparatus with a plurality of interfaces to each of which different virtual private networks are connected, the method comprising:
   assigning a specific interface which is connected to a specific virtual private network through which first application is activated, from the plurality of interfaces in response to activation of the first application;
   associating the assigned specific interface with a first identifier for identifying the first application to distinguish the first application from another application executed in the server apparatus;
   converting the first identifier included in a packet to a second identifier when the first application executed by the server apparatus sends the packet to the specific virtual private network, the second identifier identifying a type of the first application in the specific virtual private network;
   designating the assigned specific interface on the basis of the first identifier included in the packet that is sent by the first application; and
   sending the packet to the assigned specific virtual private network connected to the designated interface.

8. The method according to claim 7, further comprising:
   when the server apparatus receives another packet including a second identifier through the specific interface, converting the second identifier of the another packet to the first identifier, and
   transferring the another packet to the first application corresponding to the first identifier.

9. The method of claim 7, wherein the first application is distinguished from the another application of a same type as the first application in the server apparatus by the first identifier.

* * * * *